(12) United States Patent
Neuman

(10) Patent No.: US 7,529,426 B2
(45) Date of Patent: May 5, 2009

(54) CORRELATION FUNCTION FOR SIGNAL DETECTION, MATCH FILTERS, AND 3:2 PULLDOWN DETECTION

(75) Inventor: Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 672 days.

(21) Appl. No.: 10/946,152

(22) Filed: Sep. 21, 2004

(65) Prior Publication Data

US 2005/0169554 A1 Aug. 4, 2005

Related U.S. Application Data

(60) Provisional application No. 60/540,614, filed on Jan. 30, 2004.

(51) Int. Cl.
*G06K 9/64* (2006.01)
(52) U.S. Cl. ........................ 382/278; 382/249
(58) Field of Classification Search ........... 382/278,
382/249; 348/571, E7.015; 708/306, 320,
708/200; 600/509, 529; 358/464; 702/181,
702/189; 342/25 R, 160, 359; 340/991;
343/757; 700/213, 214
See application file for complete search history.

(56) References Cited

U.S. PATENT DOCUMENTS

| | | | | |
|---|---|---|---|---|
| 4,400,719 A | | 8/1983 | Powers | ........................ 348/450 |
| 5,732,158 A | * | 3/1998 | Jaenisch | ...................... 382/249 |
| 2005/0251056 A1 | * | 11/2005 | Gribkov et al. | ............. 600/509 |

\* cited by examiner

*Primary Examiner*—Anh Hong Do
(74) *Attorney, Agent, or Firm*—McAndrews, Held & Malloy, Ltd.

(57) ABSTRACT

A system and method that computes correlation between a first signal and a second signal. The correlation is computed as a ratio of a numerator and a denominator. The numerator may be computed similar to computing the numerator of the Pearson correlation. The denominator may be computed by multiplying the variance of the second signal and the difference between the maximum and minimum value of the first signal. A threshold, which may be programmable, may be used to determine if the first and second signal match by comparing the numerator and the product of the threshold and the denominator. If the numerator is larger than the product then the first signal and the second signal match, otherwise, there is no match. The first signal may be a sliding window of a signal. The window may be slid over the signal until a match is found between the window and the second signal.

24 Claims, 5 Drawing Sheets

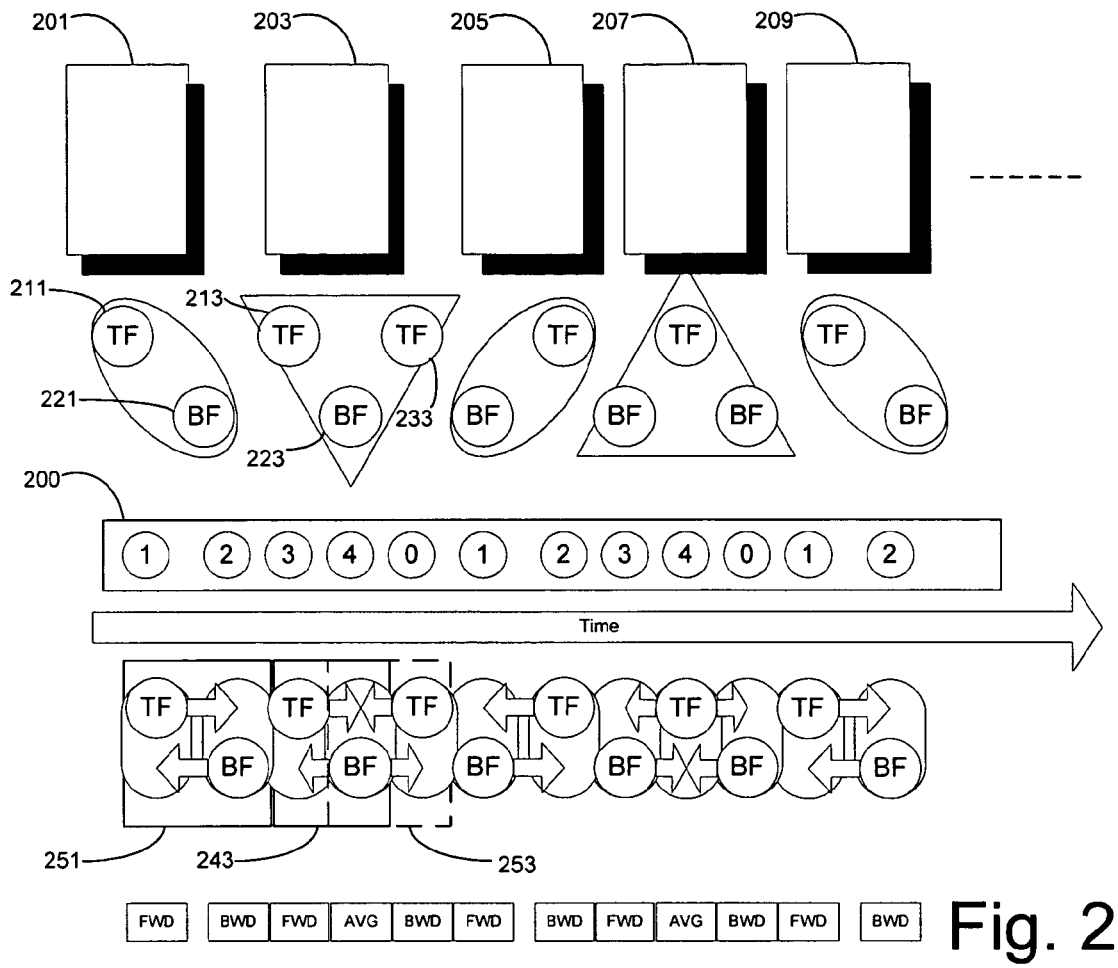
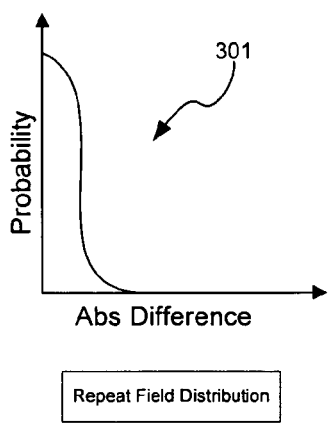
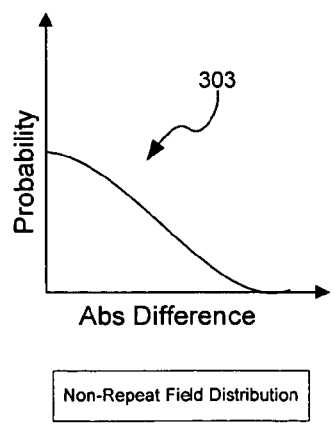
Fig. 3a    Fig. 3b

CORRELATION FUNCTION FOR SIGNAL DETECTION, MATCH FILTERS, AND 3:2 PULLDOWN DETECTION

RELATED APPLICATIONS

This patent application makes reference to, claims priority to and claims benefit from U.S. Provisional Patent Application Ser. No. 60/540,614, entitled "Improved Correlation Function for Signal Detection, Match Filters, and 3:2 Pull-down Detect," filed on Jan. 30, 2004, the complete subject matter of which is hereby incorporated herein by reference, in its entirety.

This application makes reference to:
U.S. patent application Ser. No. 10/314,525 filed Dec. 9, 2002;
U.S. patent application Ser. No. 10/945,769 filed Sep. 21, 2004;
U.S. patent application Ser. No. 10/875,422 filed Jun. 24, 2004;
U.S. patent application Ser. No. 10/945,619 filed Sep. 21, 2004;
U.S. patent application Ser. No. 10/945,587 filed Sep. 21, 2004;
U.S. patent application Ser. No. 10/871,758 filed Jun. 17, 2004;
U.S. patent application Ser. No. 10/945,796 filed Sep. 21, 2004;
U.S. patent application Ser. No. 10/945,817 filed Sep. 21, 2004;
U.S. patent application Ser. No. 10/945,729 filed Sep. 21, 2004;
U.S. patent application Ser. No. 10/945,828 filed Sep. 21, 2004;
U.S. patent application Ser. No. 10/946,153 filed Sep. 21, 2004;
U.S. patent application Ser. No. 10/945,645 filed Sep. 21, 2004; and
U.S. patent application Ser. No. 10/871,649 filed Jun. 17, 2004.

The above stated applications are hereby incorporated herein by reference in their entirety

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In the field of video compression, communication, decompression, and display, there has been for many years problems associated with supporting both interlaced content and interlaced displays along with progressive content and progressive displays. Many advanced video systems support either one or the other format. As a result such devices as deinterlacers became an important component in many video systems. Deinterlacers convert interlaced video content into progressive video format.

Generally, video is filmed at 24 frames per second (fps). Video frames are converted to NTSC video using the telecine process, during which the rate of the video must be modified for playback at 29.97 fps. During the telecine process, 12 fields, which are equivalent to 6 frames, are added to each 24 frames of video so that the same images that previously made up 24 frames of video, now comprise 30 frames of video. Without the additional fields, each frame of the 24 frames is represented with 2 fields in interlaced format. However, the addition of 12 fields means that half of the frames are represented with 3 fields instead of 2. The video is then displayed in an alternating manner, where one frame is displayed using 2 fields, then the next using 3 fields, and so on. This process is called the 3:2 pull-down.

With video in interlaced format, where each frame is represented using 2 fields, one for the top lines (top field) and the other for the bottom lines of the frame (bottom field), the 3:2 pull-down is done such that the display order is a top field followed by a bottom field. An exemplary order of display would be: top field of frame A, bottom field of frame A, top field of frame B, bottom field of frame B, top field of frame B, bottom field of frame C, top field of frame C, bottom field of frame D, top field of frame D, bottom field of frame D, and so on. So the first group of five fields has 2 bottom fields and 3 top fields, the next group of five fields has 2 top fields and 3 bottom fields, alternating, and so on.

The input to a de-interlacing device may have a video input in interlaced format as specified hereinabove. When de-interlacing interlaced content that has also been formatted for 3:2 pull-down, reverse 3:2 pull-down must be performed so as to identify the fields that make up each frame of the progressive content and to use the correct 2 fields or 3 fields that represent each frame. A de-interlacer may, however, not have the capability to determine whether the input is in the usual interlaced format (i.e. 2 fields per frame) or in a 3:2 pull-down format. Hence, a de-interlacer may require a method for detecting 3:2 pull-down.

3:2 pull-down detection requires a matched filter to detect the pull-down cadence. Normal convolution-based matched filters do a poor job since there may be a lot of noise in the signal, motion may not be clear on pull-down frames, and the overall signal may have a wide range of motion and signal intensity (brightness). There are other problems associated with using a matched filter for signal detection other than being sensitive to the noise level in a signal. One problem is that it does not work well with impulse signals, because no matter what signal is used for the matched filter, a match will occur, so a matched filter will not be discriminating enough since there is not sufficient information in an impulse signal. The convolution-based matched filter performs better when looking for a signal with a particular shape, and not an impulse. In general, convolution-based matched filter performs poorly with signals that have impulses in them. Another problem with using matched filters is that they are sensitive to DC offsets. Typically, after convolving with a matched filter, a comparison with a threshold is done, and one DC offset may give a signal strength that is higher than a smaller DC offset.

Correlation-based matched filters are immune to DC offsets, signal gain, and dynamic range, and as such they provide better detection. They also work well on matching to impulse functions. However, a correlation function is difficult to implement as it involves computation of squares and square root functions requiring very high precision, and require a great amount of hardware to implement.

Also, conventional 3:2 pull-down circuits rely upon host software to compute Pearson's Correlation, which is a standard correlation function used in correlation-based match filters. Pearson's correlation uses the variance of a signal as an estimate of error in the denominator, which is the difficult to compute. Conventional 3:2 pull-down circuits do not have the capability to operate independently in the hardware due to the complexity of the computations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system and method that computes correlation between a first signal and a second signal, wherein the first signal and the second signal have the same number of data points, and the correlation is a ratio of a numerator and a denominator. The method comprises computing the numerator and computing the variance of the second signal. A variance of the first signal may be computed using the difference between a data point with a maximum value and a data point with a minimum value in the first signal. The denominator may be computed using the product of the variance of the second signal and the variance of the first signal.

Computing the numerator comprises computing a first value by summing the product of the first signal and the second signal and computing a second value by multiplying the sum of the first signal and the sum of the second signal. A third value may be computed by subtracting the second value from the product of the number of data points and the first value. A programmable threshold value may be utilized to determine whether the first signal and the second signal match. In order to determine the match between the first signal and the second signal, the numerator may be compared to a product of the denominator and the threshold. A larger numerator may indicate the first signal and the second signal match, and a smaller numerator may indicate the first signal and the second signal do not match.

In one embodiment, the first signal may be a window of a signal, and the window may be moved until a match is found between the second signal and the window.

The system comprises at least one processor capable of performing the method as described hereinabove that enhances edges in images.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 2 illustrates an exemplary block diagram of a 3:2 pull-down and its reverse, in accordance with an embodiment of the present invention.

FIG. 3a illustrates an exemplary distribution of the absolute field differences for repeat fields, in accordance with an embodiment of the present invention.

FIG. 3b illustrates an exemplary distribution of the absolute field differences for non-repeat fields, in accordance with an embodiment of the present invention.

DETAILED DESCRIPTION OF THE INVENTION

Figure 1A:
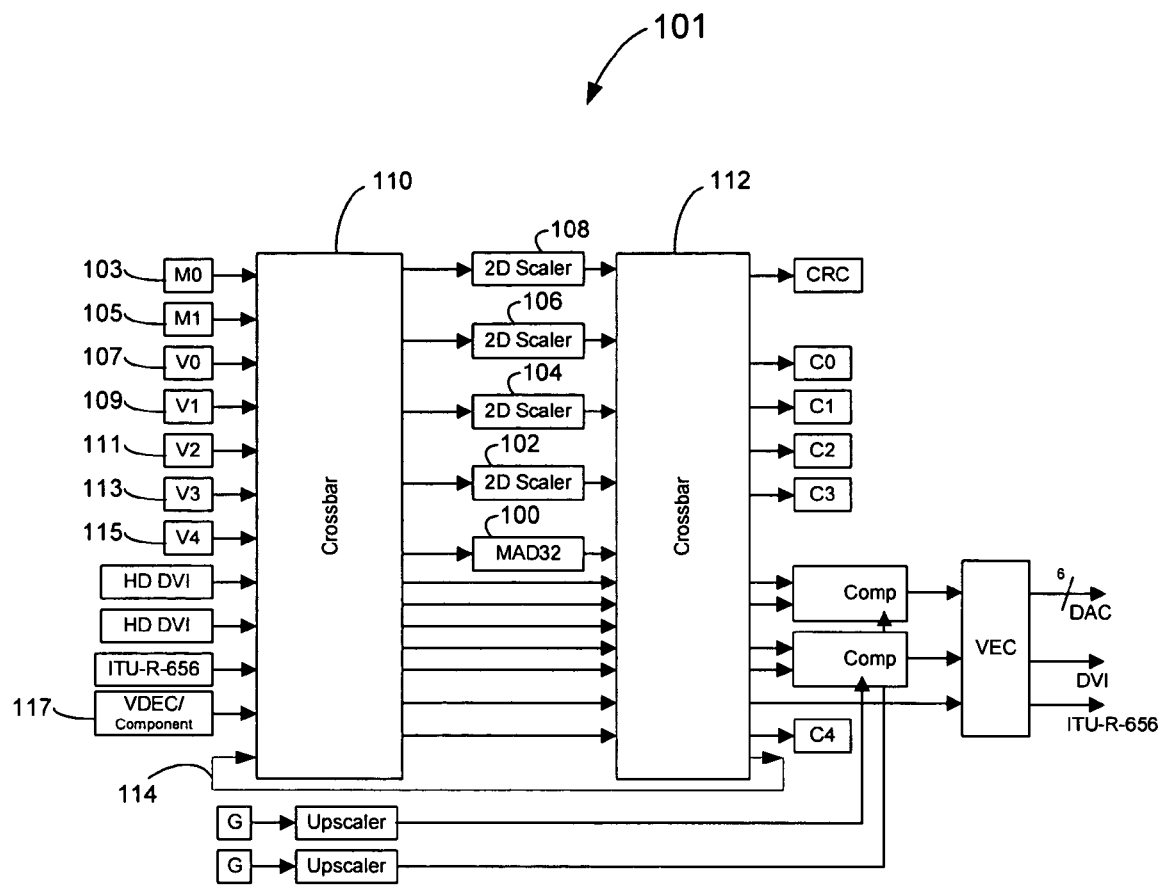
FIG. 1a illustrates a block diagram of an exemplary architecture for positioning of a MAD-3:2, in accordance with an embodiment of the present invention.

Aspects of the present invention relate to a simplified correlation function, which can be easily implemented. Although the following discusses a correlation function in terms within the scope of a video system, it should be understood that the following may be applied to other systems that utilize matched filtering and correlation functions such as, for example, communication systems and signal detection.

Certain aspects of the invention may comprise methods and systems for a motion adaptive deinterlacer (MAD) capable of reverse 3:2 pull-down and 3:2 pull-down with cadence detection, which may be referred to as MAD-3:2 or MAD32, that may be utilized in a video network (VN). The algorithms and architectures for the motion adaptive deinterlacer may be adapted to acquire interlaced video fields from one of a plurality of video sources in the video network and convert the acquired interlaced video fields into progressive frames, at double the display rate, in a visually pleasing manner.

The motion adaptive deinterlacer (MAD-3:2) may be adapted to accept interlaced video input from a video bus (VB) and output deinterlaced, progressive video to the video bus (BUS) utilized by the video network. The motion adaptive deinterlacer may accept, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field-by-field basis up to, for example, a width of 720. The motion adaptive algorithm utilized by the motion adaptive deinterlacer (MAD-3:2) may be adapted to smoothly blend various approximations for the missing pixels to prevent visible contours produced by changing decisions.

A plurality of fields of video may be utilized to determine motion. For example, in an embodiment of the invention, five fields of video may be utilized to determine motion. The motion adaptive deinterlacer (MAD) may produce stable non-jittery video with reduced risk of visual artifacts due to motion being misinterpreted while also providing improved still frame performance. The motion adaptive deinterlacer (MAD-3:2) may also provide additional fields per field type of quantized motion information, which may be selectable in order to reduce the risk of misinterpretation. For example, up to three (3) additional fields or more, per field type, of quantized low-cost motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided in order to reduce or eliminate jaggies in moving diagonal edges. The MAD-3:2 may provide reverse 3:2 pull-down for improved quality from film-based sources.

In accordance with another aspect of the invention, the algorithms and architectures for the motion adaptive deinterlacer (MAD) may also be adapted to provide bad-edit detection in order to ensure a visually pleasing transition to new cadence in situations where editing may have been carelessly performed. Furthermore, per-pixel correction may also be provided to improve the quality of subject matter containing both film and video at the same time. For example, per-pixel correction may be utilized for interlaced titles, which have been overlaid on film-based content. The motion adaptive deinterlacer (MAD-3:2) may also provide optional CPU control over, for example, 3:2 and/or 2:2 cadence detection and correction.

FIG. 1a is a block diagram of an exemplary architecture illustrating the positioning of a MAD-3:2 100, in accordance with an embodiment of the present invention. Referring to FIG. 1a, the MAD-3:2 100 along with a plurality of scalers (102, 104, 106, and 108), for example, may be positioned between a first crossbar 110 and a second crossbar 112. The first crossbar 110 may be referred to as an input crossbar and the second crossbar 112 may be referred to as an output crossbar.

The MAD-3:2 100 may comprise at least one video network input and at least one video network output and may be configured to maintain its own additional field stores. A feedback path may be provided from the output of the second crossbar 112 to the input of the first crossbar 110. This may allow any of the standard definition (SD) video sources such as the MPEG feeders 103 and 105, video feeders 107, 109, 111, 113 and 115, and/or VDEC 117, and so on, to function as an input to the MAD32 100 and/or one of the scalers 102, 104, 106, and 108. The VDEC 117 may be an analog video decoder that may process NTSC signals to separate color from luma. The MPEG feeders 103 and 105 may accept 4:2:0 and 4:2:2 video data and supply 4:2:2 video data. The video feeders 107, 109, 111, 113 and 115, may accept 4:2:2 video data and supply 4:2:2 video data. The output of the second crossbar 112 may be passed back to the first crossbar 110 via the feedback path 114.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

Figure 1B:
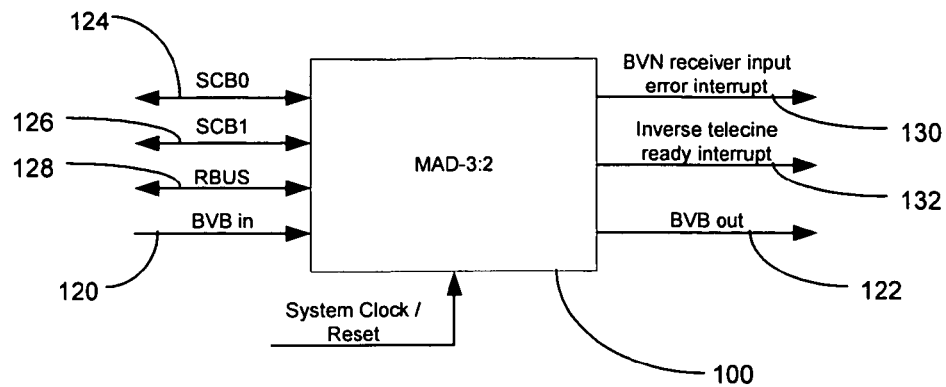
FIG. 1b illustrates a block diagram of exemplary interfaces for the MAD-3:2 shown in FIG. 1a, in accordance with an embodiment of the present invention.

FIG. 1b is a block diagram illustrating exemplary interfaces for the MAD-3:2 100 shown in FIG. 1a, in accordance with an embodiment of the present invention. Referring to FIG. 1b, the MAD-3:2 100 may comprise a plurality of bus interfaces and may include the capability to generate one or more system CPU interrupts. The MAD-3:2 100 may run on, for example, a single system clock. However, the invention may not be so limited and more than one clock may be utilized. In one embodiment of the invention, the MAD-3:2 100 may include a video bus (VB) input 120, a video bus output 122, and, for example, two independent bidirectional read/write SCB client connections, SCB0 124 and SCB 1126. The SCB may be an internal bus utilized to access frames/fields stored in the memory. The video bus (VB) input 120 may be utilized for supplying fields to the MAD-3:2 100. The video bus output 122 may allow the deinterlaced output frames to be transferred throughout the video network and pass through a scaler before reaching a composite or capture block. An RBUS interface 128 may be utilized to configure the MAD-3:2 100 or to access its status via one or more interface signals and/or registers. The RBUS may be a general-purpose bus utilized for programming registers for control and configuration of the CPU. At least a portion of the interfaces of the MAD-3:2 100 may be synchronous to a clock input of the scaler. A video network receiver input error interrupt 130 may be generated on an input field size, which may differ from a programmed field size, which is expected. An inverse telecine ready interrupt 132 may be generated for every field, or at least some fields, at the point in time when the statistics gathered in the previous field are ready to be read by a CPU or other processor.

Figure 1C:
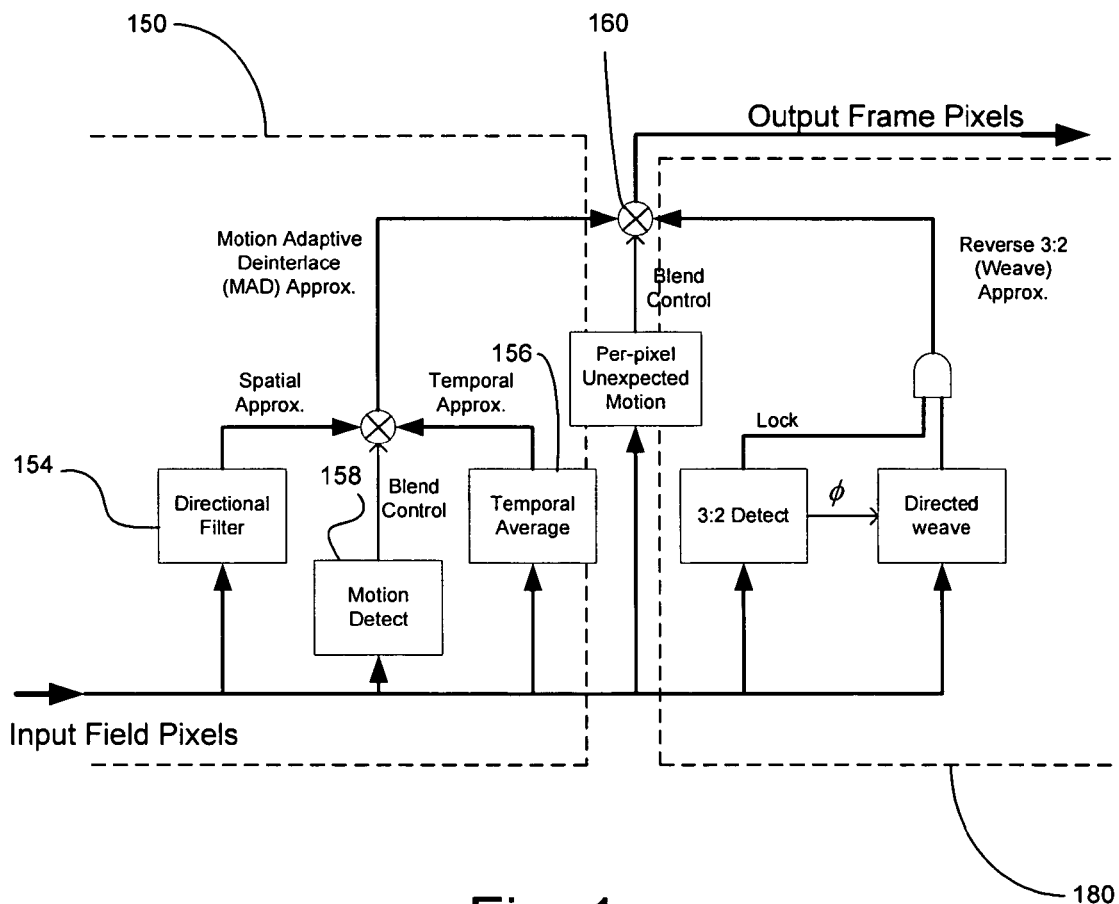
FIG. 1c illustrates a block diagram of an exemplary flow of the algorithm, which may be utilized by the MAD-3:2 of FIG. 1a and FIG. 1b, in accordance with an embodiment of the present invention.

FIG. 1c is a block diagram illustrating an exemplary flow of the algorithm which may be utilized by the MAD-3:2 100 of FIG. 1a and FIG. 1b, in accordance with an embodiment of the present invention. Referring to FIG. 1c, there is shown a data flow corresponding to the algorithm utilized for deinterlacing the luma component of video. The algorithm may effectively be divided into two sub-blocks. For example, diagrammed on the left of FIG. 1c is the motion adaptive deinterlacer (MAD) method of deinterlacing 150 and on the right, there is shown the reverse 3:2 pulldown method 180. For every output pixel, motion adaptive deinterlacing 150, reverse 3:2 pulldown 180, or a blend 160 of motion adaptive deinterlacing and reverse 3:2 deinterlacing may be utilized to determine a motion-adapted value of the output pixel under consideration.

The motion adaptive deinterlacer (MAD) 150 may comprise a directional filter 154, a temporal average 156, and a blender 158. The MAD 150 may comprise suitable logic, code, and/or circuitry and may be adapted for performing the MAD method of deinterlacing. A processor may be adapted to perform the operation of the MAD 150. The MAD 150 may comprise local memory for storage of data and/or instructions. The directional filter 154 may comprise suitable logic, code, and/or circuitry and may be adapted for spatially approximating the value of the output pixel. The temporal average 156 may comprise suitable logic, code, and/or circuitry and may be adapted for temporal approximation of the value of the output pixel. The blender 158 may comprise suitable logic, code, and/or circuitry and may be adapted to combine the temporal and spatial approximations of the value of the output pixel.

FIG. 2 illustrates an exemplary block diagram of a 3:2 pull-down and its reverse, in accordance with an embodiment of the present invention. Source video frames 201, 203, 205, 207, and 209 may be captured at a rate of 24 frames per second. Two source video frames such as, for example, frames 201 and 203, captured at a rate of 24 frames per second, may be used to generate 5 fields of video to run at 60 fields per second. Thus, generating the interlaced 3:2 pulldown video content comprising a sequence of top and bottom fields (labeled TF and BF) running at 60 fields per second. Two fields 211 and 221 represent the first source video frame 201, while three fields 213, 223, and 233 represent the second source video frame 203. Since the interlaced video has a periodicity of 5 fields, the field phase may be represented by a modulo 5 counter 200. Subsequently, the interlaced video may be de-interlaced using reverse 3:2 pull-down as illustrated by combining, for example, fields 211 and 221 into one frame 241, fields 213 and 223 into one frame 243, and frames 223 and 233 into one frame 253. The directional arrows indicate the source video frame used to generate the missing field to display de-interlaced progressive video. To correctly generate the progressive video frame, some fields may be weaved forward and some field may be weaved backward.

For example, to generate the progressive frame 251, the field 211 may be weaved forward, while the field 221 may be weaved backward. The middle field 223 generated by inter-lacing one source frame such as, for example, source video frame 203 into three fields 213, 223 and 233, may be weaved backward and forward with fields 213 and 233, respectively.

In an embodiment of the present invention, the de-inter-lacer may receive fields one by one. When reverse 3:2 pull-down is enabled, the de-interlacer may determine whether the material provided was indeed film-based video, and if so, the de-interlacer may determine the current field phase so that the reverse 3:2 weave can be carried out.

Referring to FIG. 2, it can be seen that either the top or the bottom field occurs twice from the same source frame such as, for example, the top field from frame 203, which is repeated twice as field 213 and 233. The second of the two field 233 having field phase 0, may be called the repeat field. Except for noise, the repeat field 233 may be identical to the other field 213. With noise, the difference between the two fields may be small. There may be motion in the content, in which case, the difference between other pairs of adjacent like fields (i.e. TOP-TOP or BOTTOM-BOTTOM) may be larger.

FIG. 3a illustrates an exemplary distribution 301 of the absolute field differences for repeat fields, in accordance with an embodiment of the present invention.

FIG. 3b illustrates an exemplary distribution 303 of the absolute field differences for non-repeat fields, in accordance with an embodiment of the present invention.

Referring to FIG. 3a and FIG. 3b, the field differences may be computed from the constellation of pixels in parallel with other processing. The constellation of the pixels may be such as the constellation of pixels as described by U.S. Provisional Application Ser. No. 60/540,717 filed Jan. 30, 2004, the complete subject matter of which is hereby incorporated herein by reference, in its entirety.

Mathematically, the field differences absdiff may be computed as follows:

$absdiff = abs(C-E_0)$ when the current output frame is top field originated;

$absdiff = abs(D-F_0)$ when the current output frame is bottom field originated;

where $E_0$ may be the pixel directly above the current absent pixel being created, and C may be the pixel at the same location as pixel $E_0$ in a field two fields prior to the current field. Similarly, $F_0$ may be the pixel directly below the current absent pixel being created, and D may be the pixel at the same location as pixel $F_0$ in a field two fields prior to the current field.

The absolute differences may be collected in a histogram table and utilized to approximate the probability distribution. The histogram table may have 64 identically sized bins each 4 units wide. $Bin_0$ may collect absolute differences equal to 0 through 3, while $bin_1$ may collect absolute difference values equal to 4 through 7, etc. The histogram table may be double buffered so that the contents of the table may be read by either the CPU or the reverse 3:2 pull-down circuitry of the MAD-3:2 while statistics for the next field are being collected. The variance of the distribution may be approximated using the following formula:

$$sigma = bin_1 + 2(bin_2 + bin_3) + 4(bin_4 + bin_5 + bin_6 + bin_7) + 8\sum_{n=8}^{63} bin_n$$

For example, $bin_2$ may represent the number of absolute differences that were between the values 8 and 11 inclusive, etc.

The value of sigma may be small if the absolute differences between pixel pairs generally fall into $bin_0$, since $bin_0$ may not be included in the calculation of sigma.

Figure 4:
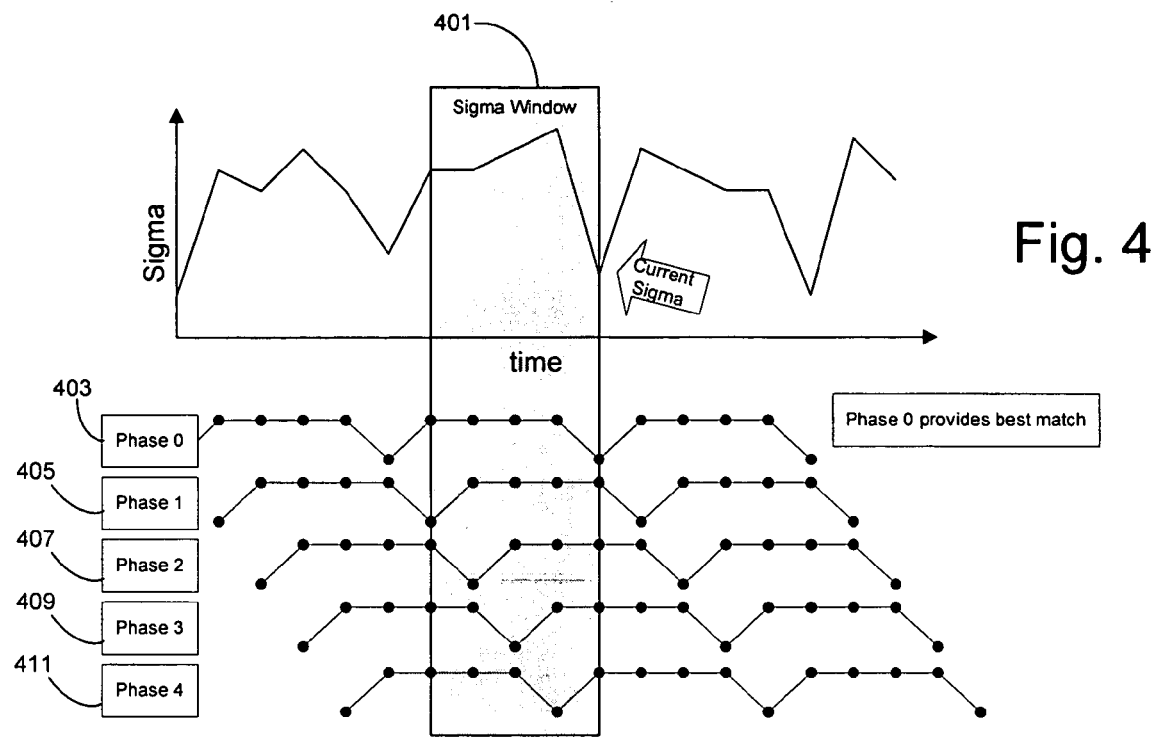
FIG. 4 illustrates an exemplary variation of sigma over time if a 3:2 pull-down is present, in accordance with an embodiment of the present invention.

FIG. 4 illustrates an exemplary variation of sigma over time if a 3:2 pull-down is present, in accordance with an embodiment of the present invention. Sigma may be calculated using the absolute differences of all pixels in a particular field. The resulting absolute difference values may then be categorized into their respective bins so that sigma may be calculated.

The shape of the characteristic dip in sigma every repeat field may be correlated against the measured sigmas. By correlating against all possible phases, the correlation (re-peatedly) indicating the best match may determine the phase of the repeat pattern. Once the phase of the repeat pattern is known, the current field phase and hence the required weave operation may be determined. A table of five sigma values may be labeled zero to four. These sigma values in the table may hold a history of the previous five sigma values measured over the previous five fields. For example, the current sigma in the sigma window 401 may be correlated against the sig-mas at phase 403, phase 405, phase 407, phase 409, and phase 411, which may correspond to phase 0, phase 1, phase 2, phase 3, and phase 4, respectively. For the current sigma window 401, phase 0 may provide the best match among the phases. The best match may be determined by computing the correlation between each of the phases and the "chunk" of sigma within the current window 401.

All the sigma values may be initialized to zero. When the first sigma value is calculated, it may overwrite the value currently in the $0^{th}$ position. The next one calculated may overwrite the $1^{st}$ position, and so on, up until the $4^{th}$ position. The process may then wrap around and the $0^{th}$ position may be overwritten again. Thus, a new sigma value may be written into the sigma table every field. Thus, after every five fields, all sigma table locations will have been replaced with new values.

The 3:2 pull-down detection may require a matching process, which may use the Pearson correlation. Each of the match phases may have values of 1 for four positions and a value of 0 at the dip.

Figure 5:
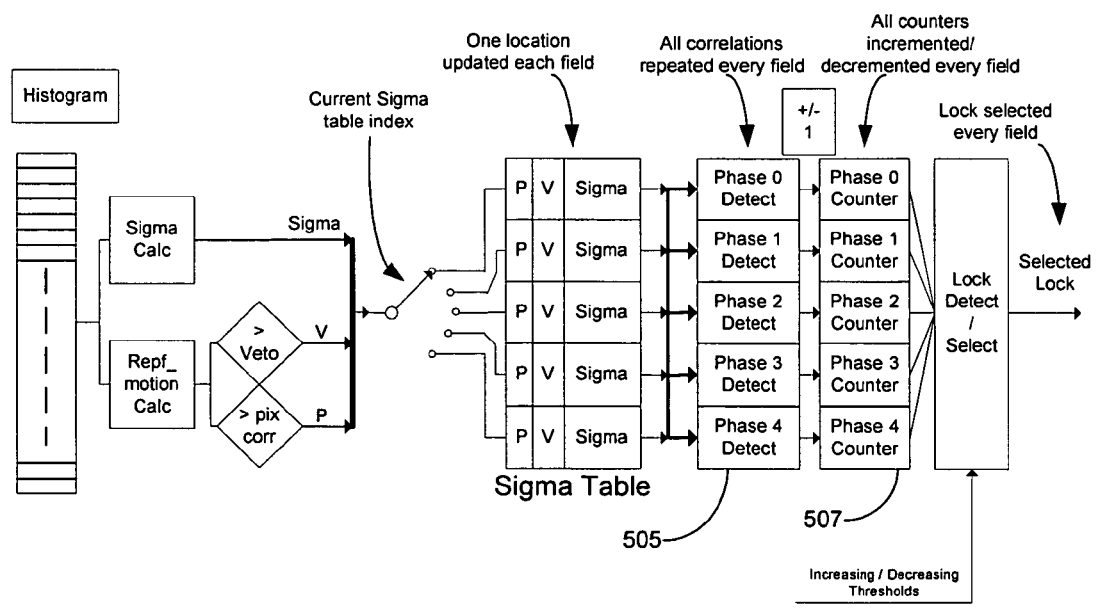
FIG. 5 illustrates a block diagram of an exemplary structure of a 3:2 detector, in accordance with an embodiment of the present invention.

FIG. 5 illustrates a block diagram of an exemplary structure of a 3:2 detector, in accordance with an embodiment of the present invention. Each of the phase detect blocks may be setup to check if a dip is located at its position. Pearson's correlation may provide an output between −1 and 1 regardless of the amplitude of the input signal. Thus, the matching may be done against the shape of the particular phase pattern rather than any particular amplitude. As a result, it may become unnecessary to directly determine the noise floor of the field differences.

The Pearson correlation may be calculated using the following formula:

$$r = \frac{n(\sum XY) - (\sum X)(\sum Y)}{\sqrt{[n\sum X^2 - (\sum X)^2][n\sum Y^2 - (\sum Y)^2]}}$$

This calculation may be simplified for the required operation. Substituting X for the data set of sigma values and Y for the data set for the particular phase pattern being matched, yields:

$X = [x_0\ x_1\ x_2\ x_3\ x_4], Y = [y_0\ y_1\ y_2\ y_3\ Y_4]$

For example, selecting the pattern for phase 1: Y=[1 0 1 1 1]. Regardless of the particular phase currently being computed and hence selected for Y, $$n = 5, \sum Y = 4, \sum Y^2 = 4, \left(\sum Y\right)^2 = 16$$

$$r = \frac{5\left(\sum XY\right) - 4\left(\sum X\right)}{2\sqrt{[5\sum X^2 - (\sum X)^2]}}$$

It can be noted that $\Sigma XY = \Sigma X - x_n$, where the particular value of n corresponds to the position of the 0 in the phase pattern currently being compared against. In the example of Y above, this may be the 1st position corresponding to an attempt to match phase 1.

$$r = \frac{\sum X - 5x_n}{2\sqrt{[5\sum X^2 - (\sum X)^2]}}$$

An exemplary implementation of this equation is shown hereinafter.

At the output of each phase detect block of the detect blocks 505 a threshold comparison may be performed. The threshold may be programmable but all phase detect blocks 505 may use the same value at any given time. The threshold comparison may yield a result that may be fed into a series of five counters 507 (labeled phase n counter). If a particular phase yields a correlation that is greater than the threshold, the corresponding counter may be incremented. If the phase yields a correlation that is less than the threshold, the counter may be decremented. When the counter value reaches an "increasing" threshold, that phase may be considered locked. If that phase continues to match, the counter may continue incrementing until it reaches a programmable saturation limit. If the count were to drop below a "decreasing" threshold then that phase may be considered unlocked. The count may then continue to decrease to a minimum counter value such as, for example, zero. Examining the counters may indicate to which phase, if any, there is a lock. More than one phase may lock, in which case the phase that was previously locked may be taken as the actual lock.

In an embodiment of the present invention, each phase detect block of the phase detect blocks 505 and its corresponding phase counter of the phase counters 507 may be searching for the repeat field at its location in the sigma table. The repeat field, by definition as shown in FIG. 2, may be labeled field phase 0. Hence when the current sigma table index points to the currently selected locked position, by definition, this may be field phase 0. The current sigma table index may point to the same sigma table index five fields later, and again the field phase will be 0. In the intervening four fields, the field phase may count 1 through 4 at each field. The current field phase may be determined directly from the current sigma table index and the selected lock position. The distance (modulo 5) between the current sigma table index and the locked position indication may provide the current field phase. For example, if the lock circuitry indicates that there is a lock to phase 1 and index 3 of the sigma table was just updated, then the actual field phase, as shown in FIG. 2, may be 2. If index 0 was just updated, then the current field phase may be 4, etc. An exemplary current field phase for each selected lock position and current sigma table index is given in the table below:

| Current Sigma Table Index | Selected Lock Position | | | | |
|---|---|---|---|---|---|
| | 0 | 1 | 2 | 3 | 4 |
| 0 | 0 | 4 | 3 | 2 | 1 |
| 1 | 1 | 0 | 4 | 3 | 2 |
| 2 | 2 | 1 | 0 | 4 | 3 |
| 3 | 3 | 2 | 1 | 0 | 4 |
| 4 | 4 | 3 | 2 | 1 | 0 |

Implementation of the Pearson correlation may be computationally expensive and may require high precision using the formula:

$$r = \frac{\sum X - 5x_n}{2\sqrt{[5\sum X^2 - (\sum X)^2]}},$$

corresponding to the exemplary values used above

Looking again at the general formula for the Pearson correlation:

$$r = \frac{n\left(\sum XY\right) - \left(\sum X\right)\left(\sum Y\right)}{\sqrt{[n\sum X^2 - (\sum X)^2][n\sum Y^2 - (\sum Y)^2]}}$$

The correlation function is a measure of the correlation between a signal X and a known signal Y against which signal X is being matched. The numerator consists of adds and multiplies, which may be simple to implement in hardware and/or software. The denominator contains squares and square roots, and those operations may be more complex to execute. For a hardware implementation, the Pearson correlation may require simplifying. The signal Y is known, and as such, the term with Y in the denominator may be known and pre-computed. The remaining term in the denominator, which is the difference between the sum of the squares and the square of the sums for the signal X, is essentially an estimate of the variance of X, var(X). A simplification to Pearson's correlation may replace the denominator with a different and simpler estimate of var(X). Since variance of a signal indicates how wide or estimates the spread of the signal. Another estimate of spread of a signal is the difference between the maximum and minimum of the signal, or in this case [Max(X)−Min(X)].

Other estimating techniques may be used to calculate the variance of X in place of the more complicated method with the squares and square roots. The signal X may comprise n points, which may be sorted from smallest to largest. In one embodiment of the present invention, the two extreme points, i.e. the smallest and the largest of the sorted points of X may be thrown away and the variance may be estimated by the difference between the new minimum and maximum, which are effectively the points with the second smallest and second largest values of the data points of X. In another embodiment of the present invention, the four extreme points, i.e. the two smallest and the two largest points of the sorted points of X may be throws away and the variance may be estimated by the difference between the new minimum and maximum, which are effectively the points with the third smallest and third largest values of the data points of X. In yet another embodiment of the present invention, the middle 68% of the sorted points of X may be used to determine the variance by taking the difference between the maximum and the minimum of the middle 68% of the data points. For example, if X contains 100 data points, after sorting them, the variance may be estimated by calculating the difference between the $16^{th}$ and the $84^{th}$ point of the sorted data points. The middle 68% of data points contain data up to one sigma away from the mid-point of the data points. In still another embodiment of the present invention, the middle 95% of the sorted points of X may be used to determine the variance by taking the difference between the maximum and the minimum of the middle 95% of the data points. For example, if X contains 100 data points, after sorting them, the variance may be estimated by calculating the difference between the $2.5^{th}$ and the $97.5^{th}$ point of the sorted data points. The middle 95% of data points contain data up to two sigmas away from the mid-point of the data points.

The change to the correlation may also include a re-mapping of the thresholds, as the Max-Min approach has a non-linear relationship to Pearson's correlation for high values of r. With the remapping, the resulting correlation may estimate the original correlation. Accordingly, the resulting approximation, using the example above, is:

$$r \approx \frac{\sum X - 5x_n}{8[\text{Max}(X \notin x_n) - \text{Min}(X \notin x_n)]}$$

An example uses the definition of the match filter below, where $x_0$-$x_4$ are the sigma values from the histogram bins of five field, and $y_0$-$y_4$ are the match filter coefficients 0 or 1.

$X=[x_0\ x_1\ x_2\ x_3\ x_4], Y=[y_0\ Y_1\ y_2\ y_3\ y_4],$

Where for phase 1: Y=[1 0 1 1 1]

The Numerator would simply be $(x_0+x_2+x_3+x_4-4*x_1)$. The Denominator would be $8*(\text{Max}(x_{0234})-\text{Min}(x_{0234})$. Note that element $x_1$ is not included in Max or Min.

The division may be performed using a weighted comparison of the numerator and denominator to perform a "thresholded" divide. The result of the correlation match is a single bit match signal that indicates the correlation exceeds the desired threshold. For example, for a certain system it may be desired to have a correlation above 0.5 indicate a match, in another system, or the same system in a different environment, for example, a more noisy environment may require more restriction for a match such as, for example, a correlation of 0.7. In the example of a system looking for a correlation above 0.5 for a match, the system may compare 2 times the numerator with the denominator to determine the match condition. Using a comparison between the numerator and denominator may eliminate the need for the divide and may further simplify the hardware that may be used to realize the correlation function by implementing the equivalent of a divide and compare in one step.

The relationship may be determined in advance between the correlation determined using the Min and Max, and the correlation determined using the Pearson method. The relationship may not be linear in nature. Where determined in advance, the threshold may be programmed accordingly. For example, it may be determined that a match may occur if the Pearson correlation is above 0.5, which may match to another value using the simpler formula such as, for example, 0.25. The numerator and denominator may then be compared as described above to determine whether there may be a match at a certain phase.

In an embodiment invention, the Pearson correlation may be divided into several levels and the corresponding correlations or the ratio of the numerator to denominator using the simplified calculation may be determined in advance and the corresponding threshold values may be preprogrammed in the system. Depending on the conditions of the environment, one of the thresholds may be selected to determine the phase that provides the best match. The correlation and comparison of the correlation to a threshold may be computed 5 times, once for each of 5 phases in the 3:2 pull-down detector every field time. The table below illustrates an exemplary division of correlations into different levels and the corresponding ration of numerator to the denominator and the corresponding threshold value:

| RThresh | divide N/D | correlation r |
|---------|------------|---------------|
| 1       | 0.125      | 0.26          |
| 2       | 0.250      | 0.50          |
| 3       | 0.375      | 0.65          |
| 4       | 0.500      | 0.75          |
| 5       | 0.625      | 0.80          |
| 6       | 0.750      | 0.85          |
| 7       | 0.875      | 0.87          |
| 8       | 1.000      | 0.90          |
| 10      | 1.250      | 0.925         |
| 12      | 1.500      | 0.95          |
| 15      | 1.875      | 0.975         |

Figure 6:
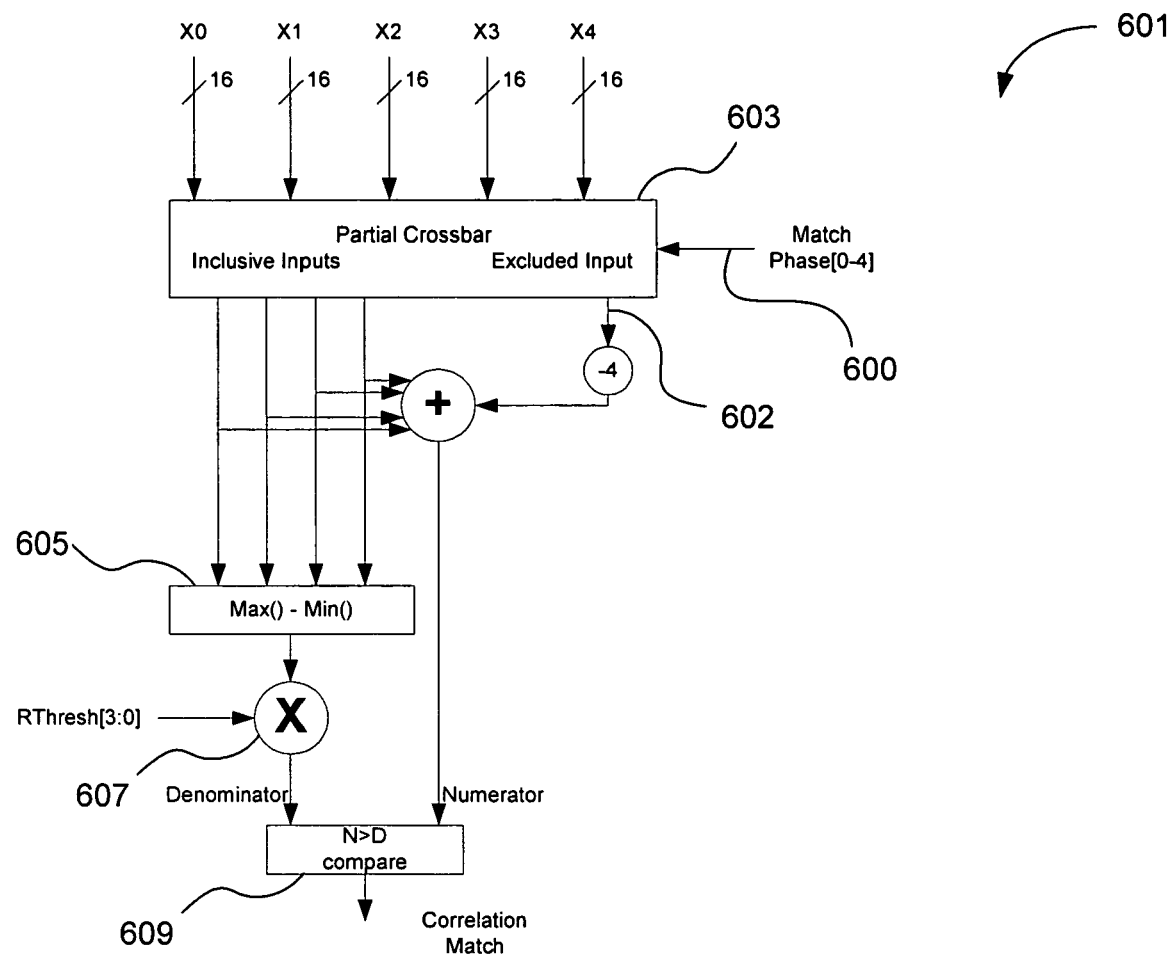
FIG. 6 illustrates a block diagram of an exemplary match filter with threshold, in accordance with an embodiment of the present invention.

FIG. 6 illustrates a block diagram of an exemplary match filter 601 with threshold, in accordance with an embodiment of the present invention. The partial crossbar 603 may select one of the 5 inputs ($X_0$, $X_1$, $X_2$, $X_3$, $X_4$) based on the matched phase. The matched phase 600 has $Y_n=0$ in the match filter equation. The match phase input may select the phase, which can be one of 5 phases. The selected $X_n$ value for the matched phase is sent to the excluded input 602 of the partial crossbar 603, the remaining 4 $X_i$ are sent to the inclusive inputs of the crossbar 603. The Included inputs $X_i$ are then sent to the Max( )-Min( ) block 605, which may compute the maximum value of the four $X_i$ inputs and subtracts the minimum value of the four $X_i$ inputs.

The threshold multiplier 607 may be utilized by user software to select different values of $R_{thresh}$ to indicate a more sensitive or more selective match filter. Larger values of $R_{thresh}$ may correspond to a more selective match filter. A more selective match filter may require a stronger 3:2 pull-down cadence in order to lock to the signal.

The N>D comparison block 609 may use 2's compliment arithmetic, as the numerator may be a negative value. The result of the comparison indicates if a match filter correlation has exceeded the threshold value. The output of the comparison block 609 may be a single bit signal, where a match may be indicated by the bit signal having the value 1.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that computes correlation between a first signal and a second signal, wherein the first signal and the second signal have the same number of data points, and the correlation is a ratio of a numerator and a denominator, the method comprising:
   using at least one processor for:
   computing the numerator;
   computing a variance of the second signal;
   computing a variance of the first signal using a difference between the data point with a maximum value and the data point with a minimum value in the first signal;
   computing the denominator using a product of the variance of the second signal and the variance of the first signal; and
   outputting correlation between the first signal and the second signal.

2. The method according to claim 1 wherein the computing of the numerator comprises:
   computing a first value by summing the product of the first signal and the second signal;
   computing a second value by multiplying the sum of the first signal and the sum of the second signal; and
   computing a third value by subtracting the second value from the product of the number of data points and the first value.

3. The method according to claim 1 further comprising comparing the correlation to a threshold value to determine whether the first signal and the second signal match.

4. The method according to claim 3 wherein the threshold is programmable.

5. The method according to claim 3 further comprising comparing the numerator to a product of the denominator and the threshold, wherein a larger numerator indicates the first signal and the second signal match, and a smaller numerator indicates the first signal and the second signal do not match.

6. The method according to claim 3 wherein the first signal corresponds to a window within a signal.

7. The method according to claim 6 further comprising aligning the window until the first signal and the second signal match.

8. The method according to claim 1 wherein the first signal is an input signal.

9. The method according to claim 1 wherein the second signal is a predetermined signal.

10. A system that computes correlation between a first signal and a second signal, wherein the first signal and the second signal have the same number of data points, and the correlation is a ratio of a numerator and a denominator, the system comprising:
    at least one processor capable of computing the numerator;
    the at least one processor capable of computing a variance of the second signal;
    the at least one processor capable of computing the variance of the first signal using a difference between the data point with the maximum value and a data point with a minimum value in the first signal; and
    the at least one processor capable of computing the denominator using a product of the variance of the second signal and the variance of the first signal.

11. The system according to claim 10 wherein to compute the numerator the at least one processor:
    computes a first value by summing the product of the first signal and the second signal;
    computes a second value by multiplying the sum of the first signal and the sum of the second signal; and
    computes a third value by subtracting the second value from the product of the number of data points and the first value.

12. The system according to claim 10 wherein the at least one processor compares the correlation to a threshold value to determine whether the first signal and the second signal match.

13. The system according to claim 12 wherein the threshold is programmable.

14. The system according to claim 12 wherein the at least one processor compares the numerator to a product of the denominator and the threshold to compare the correlation to the threshold value, wherein a larger numerator indicates the first signal and the second signal match, and a smaller numerator indicates the first signal and the second signal do not match.

15. The system according to claim 12 wherein the first signal corresponds to a window within a signal.

16. The system according to claim 15 wherein the at least one processor aligns the window until the first signal and the second signal match.

17. The system according to claim 10 wherein the first signal is an input signal.

18. The system according to claim 10 wherein the second signal is a predetermined signal.

19. The system according to claim 10 wherein the system is a part of a video network.

20. The system according to claim 10 wherein the system is a part of a communication network.

21. A method that computes variance of a signal, wherein the signal comprises data points, the method comprising:
    using at least one processor for;
    sorting the data points from smallest to largest;
    removing at least the largest data point and the smallest data point;
    calculating a difference between the data point with a maximum value and the data point with a minimum value of the remaining data points after removing at least the largest data point and the smallest data point; and
    outputting variance of the signal.

22. The method according to claim 21 wherein removing at least the largest data point and the smallest data point comprises removing the two largest data points and the two smallest data points with the minimum values.

23. The method according to claim 21 wherein removing at least the largest data point and the smallest data point comprises removing the largest 16% of data points and the smallest 16% of data points.

24. The method according to claim 21 wherein removing at least the largest data point and the smallest data point comprises removing the largest 2.5% of data points and the smallest 2.5% of data points.

* * * * *